(12) United States Patent
Lu et al.

(10) Patent No.: US 12,035,389 B2
(45) Date of Patent: Jul. 9, 2024

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Qianxi Lu, Dongguan (CN); Xin You, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 298 days.

(21) Appl. No.: 17/551,021

(22) Filed: Dec. 14, 2021

(65) Prior Publication Data
US 2022/0110173 A1    Apr. 7, 2022

Related U.S. Application Data

(63) Continuation of application No. PCT/CN2019/099584, filed on Aug. 7, 2019.

(51) Int. Cl.
*H04W 76/14*    (2018.01)
*H04W 4/02*    (2018.01)
(Continued)

(52) U.S. Cl.
CPC ........... *H04W 76/14* (2018.02); *H04W 4/023* (2013.01); *H04W 4/025* (2013.01); *H04W 8/005* (2013.01);
(Continued)

(58) Field of Classification Search
CPC ....... H04W 72/20; H04W 84/18; H04W 4/40; H04W 76/14; H04W 4/02;
(Continued)

(56) References Cited

U.S. PATENT DOCUMENTS 11,432,106 B2 *   8/2022  Zhang .................. H04W 4/021
2017/0238316 A1    8/2017  Li et al.
(Continued)

FOREIGN PATENT DOCUMENTS

CN            104301967 A       1/2015
WO     WO-2017136001 A1 *  8/2017    .......... H04W 72/048
(Continued)

OTHER PUBLICATIONS

International Search Report (ISR) dated May 8, 2020 for Application No. PCT/CN2019/099584, and its English translation provided by WIPO.
(Continued)

*Primary Examiner* — Dung Hong
(74) *Attorney, Agent, or Firm* — Ladas & Parry, LLP

(57) ABSTRACT

Embodiments of the present application disclose a wireless communication method, a terminal device, and a network device. The method includes: determining, by a terminal device, according to information of a spatial location of the terminal device, an identity of a communication sub-zone of the terminal device, where the spatial location of the terminal device includes altitude of the terminal device in a communication zone, and the communication zone includes at least one communication sub-zone in terms of the spatial location; and performing, by the terminal device, sidelink communication on a target resource pool corresponding to the identity of the communication sub-zone of the terminal device. The method, the terminal device, and the network device in the embodiments of the present application help to reduce the probability of conflict for a terminal device when performing sidelink communication.

14 Claims, 4 Drawing Sheets

(51) Int. Cl.
  *H04W 4/40* (2018.01)
  *H04W 8/00* (2009.01)
  *H04W 64/00* (2009.01)
  *H04W 72/044* (2023.01)

(52) U.S. Cl.
  CPC ......... *H04W 64/00* (2013.01); *H04W 72/044* (2013.01); *H04W 4/40* (2018.02)

(58) Field of Classification Search
  CPC . H04W 72/0446; H04W 4/023; H04W 4/025; H04W 8/005; H04W 64/00; H04W 72/044; H04L 67/104
  See application file for complete search history.

(56) References Cited

U.S. PATENT DOCUMENTS

| | | | |
|---|---|---|---|
| 2017/0289986 A1* | 10/2017 | Jin | G01S 5/0063 |
| 2018/0042037 A1* | 2/2018 | Jin | H04W 72/543 |
| 2018/0288588 A1 | 10/2018 | Uchiyama | |
| 2019/0059071 A1* | 2/2019 | Khoryaev | H04W 4/021 |
| 2019/0104512 A1* | 4/2019 | Vura | H04W 72/02 |
| 2021/0045067 A1* | 2/2021 | Zhang | H04W 52/146 |

FOREIGN PATENT DOCUMENTS

| | | | | |
|---|---|---|---|---|
| WO | 2018082062 A1 | 5/2018 | | |
| WO | WO-2018082062 A1 * | 5/2018 | ............. | H04W 4/02 |
| WO | 2019037864 A1 | 2/2019 | | |
| WO | WO-2019037864 A1 * | 2/2019 | | |
| WO | 2019114924 A1 | 6/2019 | | |
| WO | WO-2019114924 A1 * | 6/2019 | | |
| WO | 2021022509 A1 | 2/2021 | | |

OTHER PUBLICATIONS

Written Opinion dated May 8, 2020 for Application No. PCT/CN2019/099584, and its English translation provided by Google Translate.

The first Office Action of corresponding Chinese application No. 201980095172.2, dated Apr. 29, 2022, and its English Translation provided by Chinese Patent Office.

The EESR of corresponding European application No. 19940773.5, dated May 6, 2022.

The second Office Action of corresponding Chinese application No. 201980095172.2, dated Sep. 8, 2022 with machine translation by Global Dossier.

The first Office Action of corresponding European application No. 19940773.5, dated Feb. 2, 2024.

* cited by examiner

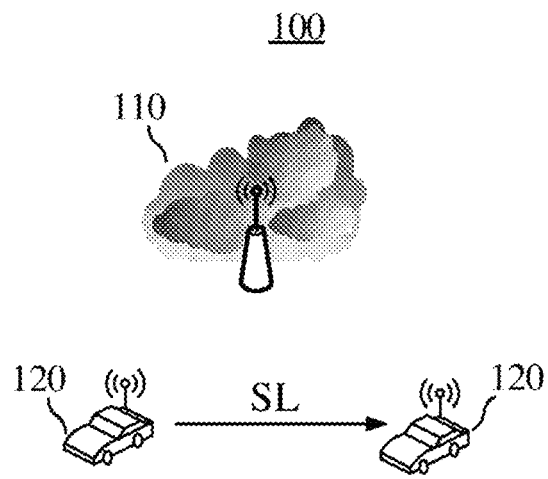
FIG. 1
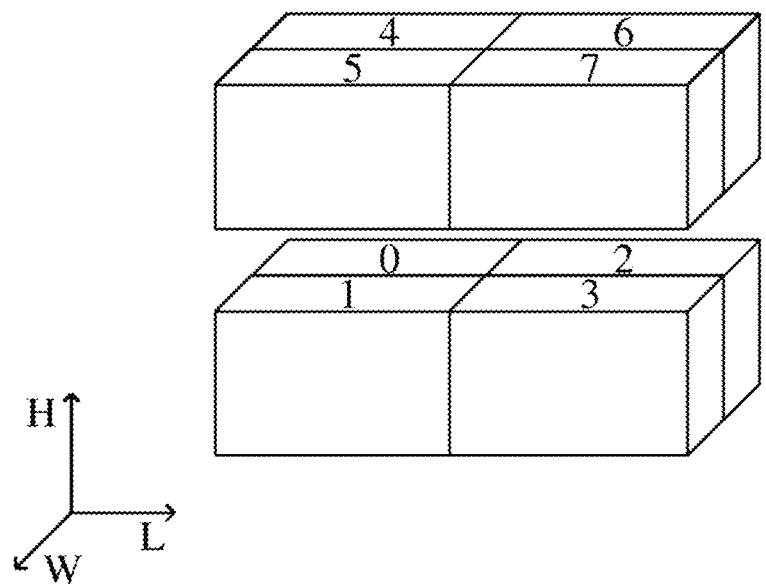
FIG. 2
FIG. 3

WIRELESS COMMUNICATION METHOD, TERMINAL DEVICE, AND NETWORK DEVICE

CROSS-REFERENCE TO RELATED APPLICATION

This application is a continuation of International Application No. PCT/CN2019/099584, filed on Aug. 7, 2019, the disclosure of which is hereby incorporated by reference in its entirety.

TECHNICAL FIELD

Embodiments of the present application relate to the field of communications and, in particular, to a wireless communication method, a terminal device, and a network device.

BACKGROUND

In a vehicle to everything system, a terminal device may randomly select a transmission resource from a large resource pool. For multiple terminal devices that need to perform sidelink communication simultaneously, this undoubtedly increases the probability of conflict for a terminal device when performing sidelink communication.

SUMMARY

Embodiments of the present application provide a wireless communication method, a terminal device, and a network device, which help to reduce the probability of conflict for a terminal device when performing sidelink communication.

In a first aspect, provided is a wireless communication method, including: determining, by a terminal device, according to information of a spatial geographic location of the terminal device, an identity of a communication sub-zone of the terminal device, where the spatial geographic location of the terminal device includes altitude of the terminal device in a communication zone, and the communication zone includes at least one communication sub-zone in terms of the spatial geographic location; and performing, by the terminal device, sidelink communication on a target resource pool corresponding to the identity of the communication sub-zone of the terminal device.

In a second aspect, provided is a wireless communication method, including: dividing, by a network device, a communication zone of a terminal device into at least one communication sub-zone in terms of a spatial geographic location, where the spatial geographic location includes altitude; and transmitting, by the network device, first configuration information to the terminal device, where the first configuration information is used by the terminal device to determine a target resource pool corresponding to an identity of the communication sub-zone of the terminal device.

In a third aspect, provided is a terminal device, where the terminal device is configured to execute the method described above in the first aspect or an implementation thereof.

Specifically, the terminal device includes a functional module for executing the method described above in the first aspect or an implementation thereof.

In a fourth aspect, provided is a network device, where the network device is configured to execute the method described above in the second aspect or an implementation thereof.

Specifically, the network device includes a functional module for executing the method described above in the second aspect or an implementation thereof.

In a fifth aspect, provided is a terminal device including a processor and a memory. The memory is configured to store a computer program, and the processor is configured to call and run the computer program stored in the memory to execute the method described above in the first aspect or an implementation thereof.

In a sixth aspect, provided is a network device including a processor and a memory. The memory is configured to store a computer program, and the processor is configured to call and run the computer program stored in the memory to execute the method described above in the second aspect or an implementation thereof.

In a seventh aspect, provided is a chip for implementing the method described above in any one of the first aspect throughout the second aspect, or an implementation thereof.

Specifically, the chip includes: a processor, configured to call and run a computer program from a memory to enable a device installed with the chip to execute the method described above in any one of the first aspect throughout the second aspect, or an implementation thereof.

In an eighth aspect, provided is a computer readable storage medium configured to store a computer program that enables a computer to execute the method described above in any one of the first aspect throughout the second aspect, or an implementation thereof.

In a ninth aspect, provided is a computer program product including a computer program instruction that enables a computer to execute the method described above in any one of the first aspect throughout the second aspect, or an implementation thereof.

In a tenth aspect, provided is a computer program which, when running on a computer, enables the computer to execute the method described above in any one of the first aspect throughout the second aspect, or an implementation thereof.

With the above-described technical solution, a communication zone of a terminal device is divided into at least one communication sub-zone based on a spatial location, and the communication sub-zone is associated with a resource pool, so that the terminal device may use the resource pool corresponding to the communication sub-zone of the terminal device to perform sidelink communication, thereby helping to reduce the probability of conflict for the terminal device when performing the sidelink communication.

These and other aspects of the present application will become more concise and comprehensible in the description of the following embodiments.

BRIEF DESCRIPTION OF DRAWINGS

FIG. 1 is a schematic diagram illustrating a communication system architecture according to an embodiment of the present application;

FIG. 2 is a schematic block diagram of a wireless communication method according to an embodiment of the present application;

FIG. 3 is a schematic diagram illustrating a division of communication sub-zones according to an embodiment of the present application;

DESCRIPTION OF EMBODIMENTS

Figure 4:
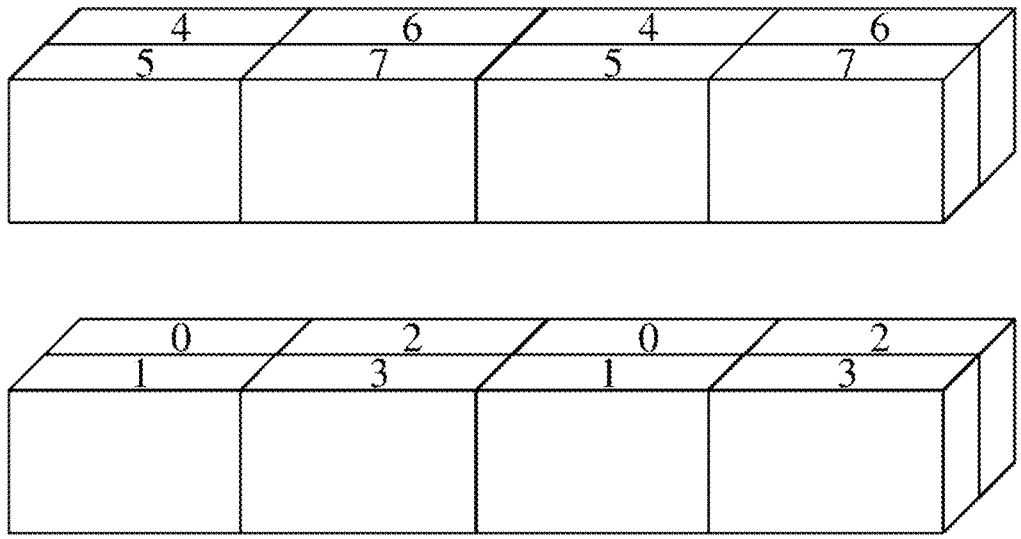
FIG. 4 is a schematic diagram illustrating a cascade connection of communication sub-zones according to an embodiment of the present application.

The technical solution in the embodiments of the present application will be described hereunder with reference to the accompanying drawings in the embodiments of the present application. Obviously, the described embodiments are a part of the embodiments of the present application, rather than all embodiments of the present application. All other embodiments obtained by persons of ordinary skill in the art based on the embodiments of the present application without any creative effort should fall into the protection scope of the present application.

It should be understood that the technical solution in the embodiments of the present application can be applied to various communication systems, such as a global system of mobile communication (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution LTE system, an LTE frequency division duplex (Frequency Division Duplex, FDD) system, an LTE time division duplex (Time Division Duplex, TDD) system, a universal mobile telecommunication system (Universal Mobile Telecommunications System, UMTS), a worldwide interoperability for microwave access (Worldwide Interoperability for Microwave Access, WiMAX) communication system, a new radio (New Radio, NR) system, a future 5G system, or the like.

In particular, the technical solution in the embodiments of the present application can be applied to various communication systems that are based on a non-orthogonal multiple access technology, such as a sparse code multiple access (Sparse Code Multiple Access, SCMA) system, a low density signature (Low Density Signature, LDS) system, etc. Certainly, the SCMA system and the LDS system can also be termed otherwise in the field of communications; further, the technical solution in the embodiments of the present application can be applied to multi-carrier transmission systems that adopt a non-orthogonal multiple access technology, such as orthogonal frequency division multiplexing (Orthogonal Frequency Division Multiplexing, OFDM), filter bank multi-carrier (Filter Bank Multi-Carrier, FBMC), generalized frequency division multiplexing (Generalized Frequency Division Multiplexing, GFDM), filtered orthogonal frequency division multiplexing (Filtered-OFDM, F-OFDM) systems using the non-orthogonal multiple access technology, etc.

Exemplarily, a communication system 100 applied in an embodiment of the present application is shown in FIG. 1. The communication system 100 may include a network device 110. The network device 110 may be a device that communicates with a terminal device 120 (or termed as a communication terminal or a terminal). The network device 110 may provide a particular geographic area with communication coverage and may communicate with a terminal device located within the coverage. In an embodiment, the network device 110 may be a base station (Base Transceiver Station, BTS) in the GSM system or the CDMA system, or a base station (NodeB, NB) in the WCDMA system, or an evolutional base station (Evolutional Node B, eNB or eNodeB) in the LTE system, or a wireless controller in a cloud radio access network (Cloud Radio Access Network, CRAN), alternatively, the network device may be a mobile switching center, a relay station, an access point, a vehicle-mounted device, a wearable device, a hub, a switch, a bridge, a router, a network device gNB in a 5G network, or a network device in a future evolutional public land mobile network (Public Land Mobile Network, PLMN), etc.

The communication system 100 also includes at least one terminal device 120 located within the coverage of the network device 110. The "terminal device" used herein includes, but is not limited to a user equipment (User Equipment, UE), an access terminal, a subscriber unit, a subscriber station, a mobile station, a mobile platform, a remote station, a remote terminal, a mobile device, a user terminal, a terminal, a wireless communication device, a user agent or a user apparatus. The access terminal may be a cellular telephone, a cordless telephone, a session initiation protocol (Session Initiation Protocol, SIP) telephone, a wireless local loop (Wireless Local Loop, WLL) station, a personal digital assistant (Personal Digital Assistant, PDA), a handheld device with wireless communication capabilities, a computing device or other processing devices connected to a wireless modem, a vehicle-mounted device, a wearable device, a terminal device in a future 5G network, a terminal device in a future evolutional public land mobile network (Public Land Mobile Network, PLMN) or the like, which is not limited in an embodiment of the present disclosure.

In an embodiment, device to device (Device to Device, D2D) communications or vehicle to everything (vehicle to everything, V2X) communications may be performed between the terminal devices 120. Such mode of direct communications between terminal devices may be termed as sidelink (Sidelink, SL) communications.

In an embodiment, the 5G system or the 5G network may also be termed as a new radio (New Radio, NR) system or an NR network.

FIG. 1 exemplarily shows one network device and two terminal devices. In an embodiment, the communication system 100 may include multiple network devices and other numbers of terminal devices may be included within the coverage of each of the network devices, which is not limited in the embodiments of the present application.

In an embodiment, the communication system 100 may further include other network entities, such as a network controller, a mobility management entity and the like, which is not limited in the embodiments of the present application.

It should be understood that devices with communication functions in the network/system according to the embodiments of the present application may be termed as communication devices. Taking the communication system 100 shown in FIG. 1 as an example, the communication devices may include the network device 110 and the terminal device 120 with communication functions, and the network device 110 and the terminal device 120 may be specific devices described above, and details will not be described herein again. The communication devices may also include other devices in the communication system 100, such as a mobility management entity (Mobility Management Entity, MME), a serving gateway (Serving Gateway, S-GW), a packet data network gateway (PDN Gateway, P-GW) or the like, which is not limited in the embodiments of the present application.

It should be understood that the terms "system" and "network" are often used interchangeably herein. The term "and/or" herein merely describes an association relationship between associated objects, which indicates that there may be three relationships, for example, A and/or B may indicate presence of A only, of both A and B, and of B only. In addition, the character "/" herein generally indicates that contextual objects have an "or" relationship.

At present, with people's pursuit of speed, delay, high-speed mobility and energy efficiency as well as diversity and complexity of services in future life, the 3rd Generation Partnership Project (the 3rd Generation Partnership Project, 3GPP)—the International Standards Organization has begun to research and develop 5G. Main application scenarios of 5G include: enhanced mobile broadband (Enhanced Mobile Broadband, eMBB), ultra-reliable and low latency communication (Ultra Reliable & Low Latency Communication, URLLC), and massive machine type of communication (massive Machine Type of Communication, mMTC).

NR can also be deployed independently. In the 5G network environment, for the purpose of reducing air interface signaling, quickly restoring wireless connection and quickly restoring data traffic, a new RRC state is defined, i.e., an RRC_INACTIVE state. This state is different from RRC_IDLE and RRC_ACTIVE states.

RRC_IDLE: Mobility is UE-based cell selection and reselection. Paging is initiated by a core network (Core Network, CN), and a paging area is configured by the CN. There is no UE access stratum (access stratum, AS) context on the base station side. There is no RRC connection.

RRC_CONNECTED: There is an RRC connection, and there is a UE AS context between a base station and a UE. The network side knows that the location of the UE is of a specific cell level. Mobility is the mobility controlled by the network side. Unicast data can be transmitted between the UE and the base station.

RRC_INACTIVE: Mobility is UE-based cell selection and reselection, there is a CN-NR connection, a UE AS context is stored in a certain base station, paging is triggered by a radio access network (Radio Access Network, RAN), an RAN-based paging area is managed by the RAN, and the network side knows that the location of the UE is of an RAN-based paging area level.

In NR-V2X, there is a need to support autopilot, thus higher requirements are imposed on data interaction between vehicles, e.g., higher throughput, lower latency, higher reliability, larger coverage, and more flexible resource allocation, etc.

In an NR-V2X system, multiple transmission modes have been introduced. In one of the transmission modes, a terminal device initiatively selects a transmission resource from a resource pool, while for multiple terminal devices that need to perform sidelink communication simultaneously, this undoubtedly increases the probability of conflict for a terminal device when performing sidelink communication.

Therefore, the embodiment of the present application provides a zone-based resource pool division method, according to which the communication zone of the terminal device is divided into multiple communication sub-zones, where each of the communication sub-zones corresponds to a corresponding resource pool. When the terminal device is in a different communication sub-zone, a resource pool corresponding to the communication sub-zone is used to perform data transmission.

FIG. 2 shows a schematic block diagram illustrating a wireless communication method 200 according to an embodiment of the present application. As shown in FIG. 2, the method includes some or all of the following contents:

S210, a terminal device determines, according to information of a spatial geographic location of the terminal device, an identity of a communication sub-zone of the terminal device, where the spatial geographic location of the terminal device includes altitude of the terminal device in a communication zone, and the communication zone includes at least one communication sub-zone in terms of the spatial geographic location; and S220, the terminal device performs sidelink communication on a target resource pool corresponding to the identity of the communication sub-zone of the terminal device.

Specifically, the communication zone of the terminal device may refer to a serving cell of the terminal device, or an area covered by a network device that serves the terminal device, or the like. The communication zone may be divided based on at least one direction. In an embodiment, the direction may be a direction defined based on the spatial geographic location. For example, the communication zone may be divided based on the spatial geographic location in terms of any one of longitude, latitude and altitude directions. For another example, the communication zone may be divided based on the spatial geographic location in terms of at least two of longitude, latitude and altitude directions, alternatively, for another example, the communication zone may also be divided based on the spatial geographic location in terms of longitude, latitude and altitude directions. Alternatively, the direction also may be self-defined, for example, a three-dimensional coordinate system is defined, and the communication zone is divided based on the three-dimensional coordinate system.

If the communication zone of the terminal device is divided based on a direction defined by the spatial geographic location, the terminal device may determine a communication sub-zone of the terminal device based on information of the current spatial geographic location of the terminal device, for example, determine the identity of the communication sub-zone of the terminal device. Furthermore, the terminal device may determine a corresponding resource pool according to the identity of the communication sub-zone of the terminal device, and perform sidelink communication on the determined resource pool.

A few specific embodiments will be given hereunder to describe in detail a manner in which the communication zone is divided in the embodiments of the present application.

First, the communication zone is divided based on the spatial geographic location in terms of any one of longitude, latitude and altitude directions. That is to say, the communication zone may be divided based on a one-dimensional spatial geographic location. Taking the altitude as an example, the terminal device may determine the identity of the communication sub-zone of the terminal device based on configuration information (i.e., first configuration information as described below) of the communication sub-zone and the information of the spatial geographic location of the terminal device. The first configuration information may include, for example, a dimension of each communication sub-zone in terms of altitude, and the information of the spatial geographic location of the terminal device may include distance information of the spatial geographic location of the terminal device relative to a specific location in the entire communication zone, where the specific location may be a location that is defined as a starting point in an altitude direction of the communication zone, for example, the starting point may be a sea horizon in the entire communication field. Specifically, the identity ID of the communication sub-zone of the terminal device may be obtained by:

ID=z1; where z1=Floor (z/H) Mod $N_z$, H indicates a dimension of each communication sub-zone in terms of altitude, z indicates a distance of the spatial geographic location of the terminal device relative to a specific location (0,0,0) in terms of altitude, $N_z$ indicates a repetition period of the identity of the communication sub-zone in terms of altitude, Floor is a round-down function, and Mod is a remainder function. In an embodiment, the specific location may be a location of which the altitude is the sea horizon.

Second, in a V2X system, for some terminal devices such as vehicles, communication is performed on the ground, the communication zone may be divided based on a two-dimensional spatial geographic location, such as longitude and latitude. The terminal device may determine the identity of the communication sub-zone of the terminal device according to first configuration information and the information of the spatial geographic location of the terminal device. The first configuration information may include, for example, spatial dimension information of each communication sub-zone. For example, the communication zone is divided into communication sub-zones of equal dimension. Specifically, each communication sub-zone has a same dimension in terms of longitude direction, and each communication sub-zone has a same dimension in terms of latitude direction. The information of the spatial geographic location of the terminal device may be distance information of the spatial geographic location of the terminal device relative to a specific location in the entire communication zone, and the specific location is defined as a starting point in a respective direction of the communication zone, such as (0,0).

In a possible embodiment, a different identity (identity, ID) may be configured for each communication sub-zone divided above, then the terminal device may determine the identity of the communication sub-zone of the terminal device based on the information of the spatial geographic location of the terminal device and the spatial dimension information of each communication sub-zone.

In another possible embodiment, also, multiple communication sub-zones may be divided into one communication group. Moreover, communication sub-zones included in each communication group have the same number and arrangement, communication sub-zones having a same location in each communication group have a same identity, and the communication sub-zones having the same identity correspond to a same resource pool. In other words, the identity of the communication sub-zone may be of a periodic arrangement in terms of longitude; similarly, the identity of the communication sub-zone may also be of a periodic arrangement in terms of latitude. The first configuration information may also include a repetition period of the identity of the communication sub-zone in the respective direction (including longitude and latitude). The following is an example to illustrate that the identity ID of the communication sub-zone of the terminal device may be obtained by:

ID=y1*$N_x$+x1; where x1=Floor (x/L) Mod $N_x$, y1=Floor (y/W) Mod $N_y$, L indicates a dimension of each communication sub-zone in terms of longitude, W indicates a dimension of each communication sub-zone in terms of latitude, x indicates a distance of the spatial geographic location of the terminal device relative to the specific location (0,0) in terms of longitude, y indicates a distance of the spatial geographic location of the terminal device relative to the specific location (0,0) in terms of latitude, $N_x$ indicates a repetition period of the identity of the communication sub-zone in terms of longitude, $N_y$ indicates a repetition period of the identity of the communication sub-zone in terms of latitude, Foor is a round-down function, and Mod is a remainder function.

Third, in the V2X system, there are also some terminal devices, such as unmanned aerial vehicles (Unmanned Aerial Vehicle, UAV), briefly as UAV, which have gained a huge increase for their global market in the past decade and have now become an important tool for commercial, governmental and consuming applications. The UAV can support solutions in many fields, which can be widely used in construction, oil, natural gas, energy, public utilities, agriculture and other fields. Currently, the UAV technology is developing rapidly in the direction of military-civilian integration. The UAV industry has become the most dynamic emerging market in international aerospace and has become the highlight of the economic growth of various countries. UAVs communicate at a high altitude, and then the communication zone may be divided based on a three-dimensional spatial geographic location, such as longitude, latitude, and altitude. The terminal device may determine the identity of the communication sub-zone of the terminal device according to first configuration information and the information of the spatial geographic location of the terminal device. The first configuration information includes, for example, spatial dimension information of each communication sub-zone. For example, the communication zone is divided into communication sub-zones of equal dimension. Specifically, each communication sub-zone has a same dimension in terms of longitude direction, each communication sub-zone has a same dimension in terms of latitude direction, and each communication sub-zone has a same dimension in terms of altitude direction. The information of the spatial geographic location of the terminal device may be distance information of the spatial geographic location of the terminal device relative to a specific location in the entire communication zone, and the specific location is defined as a starting point in a respective direction of the communication zone, such as (0,0,0).

In a possible embodiment, an identity (identity, ID) may be configured for each communication sub-zone divided above, then the terminal device may determine the identity of the communication sub-zone of the terminal device based on the information of the spatial geographic location of the terminal device and the spatial dimension information of each communication sub-zone.

In another possible embodiment, also, multiple communication sub-zones may be divided into one communication group. Moreover, communication sub-zones included in each communication group have the same number and arrangement, communication sub-zones having a same location in each communication group have a same identity, and the communication sub-zones having the same identity correspond to a same resource pool. In other words, the identity of the communication sub-zone may be of a periodic arrangement in terms of longitude, the identity of the communication sub-zone may also be of a periodic arrangement in terms of latitude, and the identity of the communication sub-zone may also be of a periodic arrangement in terms of altitude. The first configuration information may also include a repetition period of the identity of the communication sub-zone in the respective direction (including longitude, latitude and altitude). The following is an example to illustrate that the identity ID of the communication sub-zone of the terminal device may be obtained by:

ID=$z1*N_y*N_x+y1*N_x+x1$; where x1=Floor (x/L) Mod $N_x$, y1=Floor (y/W) Mod $N_y$, z1=Floor (z/H) Mod $N_z$, L indicates a dimension of each communication sub-zone in terms of longitude, W indicates a dimension of each communication sub-zone in terms of latitude, H indicates a dimension of each communication sub-zone in terms of altitude, x indicates a distance of the spatial geographic location of the terminal device relative to the specific location (0,0,0) in terms of longitude, y indicates a distance of the spatial geographic location of the terminal device relative to the specific location (0,0,0) in terms of latitude, z indicates a distance of the spatial geographic location of the terminal device relative to the specific location (0,0,0) in terms of altitude, $N_x$ indicates a repetition period of the identity of the communication sub-zone in terms of longitude, $N_y$ indicates a repetition period of the identity of the communication sub-zone in terms of latitude, $N_z$ indicates a repetition period of the identity of the communication sub-zone in terms of altitude, Foor is a round-down function, and Mod is a remainder function. In an embodiment, the specific location may be a location of which the altitude is the sea horizon.

In an embodiment, the terminal device in the embodiment of the present application may be an unattended terminal, for example, it may be a terminal device carried on an UAV.

In an embodiment, $N_x$, $N_y$, and $N_z$ each are positive integers greater than 1.

The technical solution directed at the unattended terminal in the embodiment of the present application will be described hereunder in detail in conjunction with FIG. 3 and FIG. 4.

As shown in FIG. 3, the longitude direction is L, the latitude direction is W, and the altitude direction is H. $N_x$, $N_y$, and $N_z$ each are 2. The upper four communication sub-zones have identities of 4, 5, 6 and 7 respectively; the lower four communication sub-zones have identities of 0, 1, 2 and 3 respectively. FIG. 4 shows a schematic diagram illustrating a cascade connection of communication sub-zones in the L direction. That is to say, the identities of the communication sub-zones are of a periodic repetition in the L direction. It should be noted that the identities of the communication sub-zones may also be of a periodic repetition in at least one of the longitude, latitude and altitude directions. For example, $N_x$ is 2, while $N_y$ and $N_z$ are both 0.

Configuration of a resource pool for each communication sub-zone may be configuration of a resource pool for an identity of each communication sub-zone. The method that is used may be overhead-saving, according to which the identity of the communication sub-zone is of a periodic repetition in a respective direction. Moreover, when the repetition period is greater than 1, communication sub-zones with a same identity are allowed to have a certain distance therebetween, thus it may be ensured that terminal devices will not select, in adjacent communication sub-zones, the same resource pool for data transmission, thereby helping to avoid a resource conflict.

The association relationship between the identity of the communication sub-zone and the resource pool may be configured by the network device to the terminal device, or may be pre-agreed by the network device and the terminal device. One communication sub-zone may be associated with one resource pool, then sidelink communication may be performed on the associated resource pool after the terminal device determines the identity of the communication sub-zone of the terminal device; alternatively, one communication sub-zone may also be associated with multiple resource pools, then a resource pool may be selected from the associated multiple resource pools for sidelink communication when the terminal device determines the identity of the communication sub-zone of the terminal device.

In addition, the configuration information of the communication sub-zone, that is, the first configuration information, may be transmitted to the terminal device in the following ways: first, system message broadcasting (such as SIB21, SIB26 or other SIBs), this configuration manner is adaptable to be used by a terminal device within network coverage, including a terminal device in an Idle state, in a connected state or in an inactive state; second, radio resource control (Radio Resource Control, RRC) dedicated signaling (e.g., an RRC reconfiguration message), this configuration manner is adaptable to a terminal device in a connected state; third, being pre-configured to a terminal device, this configuration manner is adaptable to a terminal device without network coverage.

It should be noted that, for any terminal device in sidelink communication, a communication zone of the terminal device may be divided based on a spatial geographic location in terms of a one-dimensional division method, or based on a spatial geographic location in terms of a two-dimensional division method, or based on a spatial geographic location in terms of a three-dimensional division method, which is not limited in the embodiment of the present application.

Figure 5:
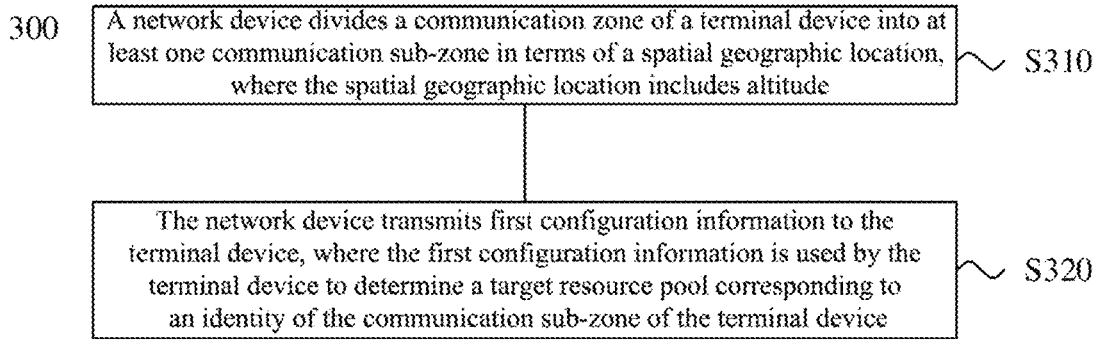
FIG. 5 is a schematic block diagram illustrating a wireless communication method according to an embodiment of the present application.

FIG. 5 is a schematic block diagram illustrating a sidelink communication method 300 according to an embodiment of the present application. As shown in FIG. 5, the method 300 includes some or all of the following contents:

S310, a network device divides a communication zone of a terminal device into at least one communication sub-zone in terms of a spatial geographic location, where the spatial geographic location includes altitude; and S320, the network device transmits first configuration information to the terminal device, where the first configuration information is used by the terminal device to determine a target resource pool corresponding to an identity of the communication sub-zone of the terminal device.

In an embodiment of the present application, the spatial geographic location further includes longitude and latitude.

In an embodiment of the present application, the method further includes: transmitting, by the network device, second configuration information to the terminal device, where the second configuration information is used by the terminal device to determine the identity of the communication sub-zone of the terminal device, the second configuration information includes spatial dimension information of each communication sub-zone, and the spatial dimension information includes a dimension of each communication sub-zone in a respective direction of the spatial geographic location.

In an embodiment of the present application, the identity of the communication sub-zone included in the communication zone is of a periodic repetition in the respective direction, and the second configuration information further includes a repetition period of the identity of the communication sub-zone in the respective direction.

In an embodiment of the present application, the transmitting, by the network device, the second configuration information to the terminal device includes: transmitting, by the network device, the second configuration information to the terminal device through a system message or radio resource control RRC dedicated signaling.

In an embodiment of the present application, the terminal device is an unattended terminal.

It should be understood that the interaction between the network device and the terminal device described on the network side as well as related characteristics and functions correspond to related characteristics and functions of the terminal device. Moreover, the related content has been described in detail in the method 200 described above, and for the sake of brevity, details will not be described here again.

It should also be understood that in various embodiments of the present application, the sequence numbers of the above-mentioned processes do not mean a chronological order of execution, and the chronological order of execution for the processes should be determined by their functions and internal logic, but should not impose any limitation to implementations of the embodiments of the present application.

The wireless communication method according to the embodiment of the present application has been described in detail above. Hereinafter, a wireless communication apparatus according to an embodiment of the present application will be described with reference to FIG. 6 to FIG. 8. The technical features described in the method embodiments are applicable to the following apparatus embodiments.

Figure 6:
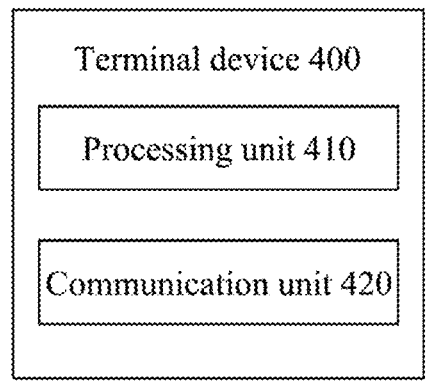
FIG. 6 is a schematic block diagram illustrating a terminal device according to an embodiment of the present application.

FIG. 6 shows a schematic block diagram illustrating a terminal device 400 according to an embodiment of the present application. As shown in FIG. 6, the terminal device 400 includes:

a processing unit 410, configured to determine, according to information of a spatial geographic location of the terminal device, an identity of a communication sub-zone of the terminal device, where the spatial geographic location of the terminal device includes altitude of the terminal device in a communication zone, and the communication zone includes at least one communication sub-zone in terms of the spatial geographic location; and a communication unit 420, configured to perform sidelink communication on a target resource pool corresponding to the identity of the communication sub-zone.

In an embodiment of the present application, the spatial geographic location of the terminal device further includes longitude and latitude of the terminal device in the communication zone.

In an embodiment of the present application, the processing unit is specifically configured to: determine, according to first configuration information and the information of the spatial geographic location of the terminal device, the identity of the communication sub-zone of the terminal device, where the first configuration information includes spatial dimension information of each communication sub-zone, the spatial dimension information includes a dimension of each communication sub-zone in a respective direction of the spatial geographic location, the information of the spatial geographic location of the terminal device is distance information of the spatial geographic location of the terminal device relative to a specific location in the communication zone, and the specific location is a location in the communication zone that is a starting point in the respective direction.

In an embodiment of the present application, the identity of the communication sub-zone included in the communication zone is of a periodic repetition in the respective direction, and the first configuration information further includes a repetition period of the identity of the communication sub-zone in the respective direction.

In an embodiment of the present application, the processing unit is specifically configured to: determine the identity ID of the communication sub-zone of the terminal device according to the following formula: $ID = z1 * N_y * N_x + y1 * N_x + x1$; where $x1 = \text{Floor}(x/L) \bmod N_x$, $y1 = \text{Floor}(y/W) \bmod N_y$, $z1 = \text{Floor}(z/H) \bmod N_z$, x is a distance of the spatial geographic location of the terminal device relative to the specific location in terms of longitude, y is a distance of the spatial geographic location of the terminal device relative to the specific location in terms of latitude, z is a distance of the spatial geographic location of the terminal device relative to the specific location in terms of altitude, L is a dimension of each communication sub-zone in terms of longitude, W is a dimension of each communication sub-zone in terms of latitude, H is a dimension of each communication sub-zone in terms of altitude, $N_x$ is a repetition period of the identity of the communication sub-zone in terms of longitude, $N_y$ is a repetition period of the identity of the communication sub-zone in terms of latitude, $N_z$ is a repetition period of the identity of the communication sub-zone in terms of altitude, function Floor indicates rounding down, and function Mod indicates remainder taking.

In an embodiment of the present application, $N_x$, $N_y$, and $N_z$ each are positive integers greater than 1.

In an embodiment of the present application, the processing unit is specifically configured to: determine the identity ID of the communication sub-zone of the terminal device according to the following formula: $ID = z1$; where $z1 = \text{Floor}(z/H) \bmod N_z$, z is a distance of the spatial geographic location of the terminal device relative to the specific location in the communication zone in terms of altitude, H is a dimension of each communication sub-zone in terms of altitude, $N_z$ is a repetition period of the identity of the communication sub-zone in terms of altitude, the specific location is a location in the communication zone that is a starting point in terms of altitude, function Floor indicates rounding down, and function Mod indicates remainder taking.

In an embodiment of the present application, the identity of the communication sub-zone of the terminal device corresponds to one resource pool which is the target resource pool.

In an embodiment of the present application, the identity of the communication sub-zone of the terminal device corresponds to multiple resource pools, and the processing unit is further configured to: determine the target resource pool from the multiple resource pools.

In an embodiment of the present application, the first configuration information is transmitted or pre-configured to the terminal device through system message broadcasting or radio resource control RRC dedicated signaling.

In an embodiment of the present application, the terminal device is an unattended terminal.

It should be understood that the terminal device 400 according to the embodiment of the present application may correspond to the terminal device in the method embodiment of the present application. Moreover, the above-mentioned and other operations and/or functions of respective units in the terminal device 400 are used to implement corresponding processes of the terminal device in the method of FIG. 2, respectively. For the sake of brevity, details will not be described here again.

Figure 7:
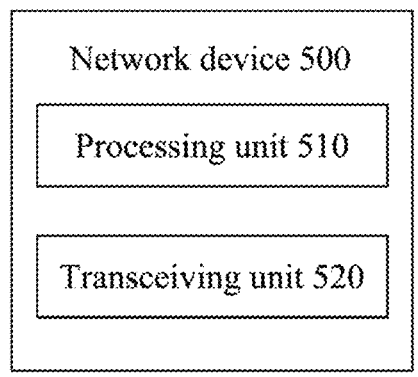
FIG. 7 is a schematic block diagram illustrating a network device according to an embodiment of the present application.

FIG. 7 shows a schematic block diagram illustrating a network device 500 according to an embodiment of the present application. As shown in FIG. 7, the network device 500 includes:

- a processing unit 510, configured to divide a communication zone of a terminal device into at least one communication sub-zone in terms of a spatial geographic location, where the spatial geographic location includes altitude; and
- a transceiving unit 520, configured to transmit first configuration information to the terminal device, where the first configuration information is used by the terminal device to determine a target resource pool corresponding to an identity of the communication sub-zone of the terminal device.

In an embodiment of the present application, the spatial geographic location further includes longitude and latitude.

In an embodiment of the present application, the transceiving unit is further configured to: transmit second configuration information to the terminal device, where the second configuration information is used by the terminal device to determine the identity of the communication sub-zone of the terminal device, the second configuration information includes spatial dimension information of each communication sub-zone, and the spatial dimension information includes a dimension of each communication sub-zone in a respective direction of the spatial geographic location.

In an embodiment of the present application, the identity of the communication sub-zone included in the communication zone is of a periodic repetition in the respective direction, and the second configuration information further includes a repetition period of the identity of the communication sub-zone in the respective direction.

In an embodiment of the present application, the transceiving unit is specifically configured to: transmit the second configuration information to the terminal device through a system message or radio resource control RRC dedicated signaling.

In an embodiment of the present application, the terminal device is an unattended terminal.

It should be understood that the network device 500 according to the embodiment of the present application may correspond to the network device in the method embodiment of the present application. Moreover, the above-mentioned and other operations and/or functions of respective units in the network device 500 are used to implement corresponding processes of the network device in the method of FIG. 5, respectively. For the sake of brevity, details will not be described here again.

Figure 8:
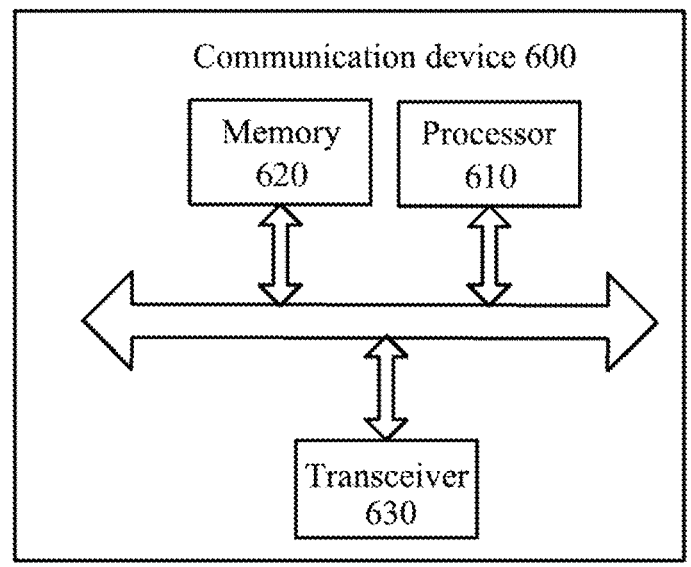
FIG. 8 is a schematic block diagram illustrating a communication device according to an embodiment of the present application.

FIG. 8 is a schematic structural diagram illustrating a communication device 600 according to an embodiment of the present application. The communication device 600 show in FIG. 8 includes a processor 610, where the processor 610 may call and run a computer program from a memory to implement a method in an embodiment of the present application.

In an embodiment, as shown in FIG. 8, the communication device 600 may further include a memory 620, where the processor 610 may call and run a computer program from the memory 620 to implement the method in the embodiments of the present application.

The memory 620 may be a separate device independent of the processor 610, or may be integrated in the processor 610.

In an embodiment, as shown in FIG. 8, the communication device 600 may further include a transceiver 630, and the processor 610 may control the transceiver 630 to communicate with a further device, in particular, it may transmit information or data to the further device, or receive information or data transmitted from the further device.

The transceiver 630 may include a transmitter and a receiver. The transceiver 630 may further include an antenna, and there may be one or more antennas in number.

In an embodiment, the communication device 600 may be specifically a network device according to an embodiment of the present application, and the communication device 600 may implement corresponding processes implemented by the network device in each method according to the embodiments of the present application. For the sake of brevity, details will not be described here again.

In an embodiment, the communication device 600 may be specifically a terminal device according to an embodiment of the present application, and the communication device 600 may implement corresponding processes implemented by the terminal device in each method according to the embodiments of the present application. For the sake of brevity, details will not be described here again.

Figure 9:
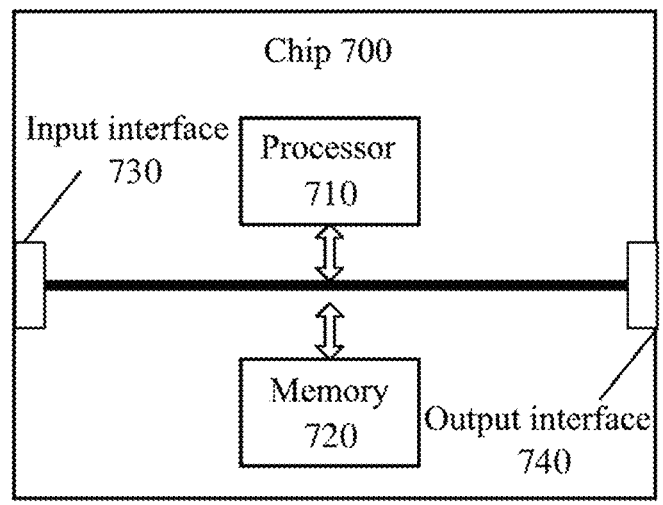
FIG. 9 is a schematic block diagram illustrating a chip according to an embodiment of the present application.

FIG. 9 is a schematic structural diagram illustrating a chip according to an embodiment of the present application. The chip 700 shown in FIG. 9 includes a processor 710 which may call and run a computer program from a memory to implement a method in an embodiment of the present application.

In an embodiment, as shown in FIG. 9, the chip 700 may further include a memory 720. The processor 710 may call and run a computer program from the memory 720 to implement a method in an embodiment of the present application.

The memory 720 may be a separate device independent of the processor 710 or may be integrated in the processor 710.

In an embodiment, the chip 700 may further include an input interface 730. The processor 710 may control the input interface 730 to communicate with a further device or chip, in particular, to acquire information or data transmitted by the further device or chip.

In an embodiment, the chip 700 may further include an output interface 740. The processor 710 may control the output interface 740 to communicate with a further device or chip, in particular, to output information or data to the further device or chip.

In an embodiment, the chip can be applied to a network device in an embodiment of the present application; moreover, the chip may perform corresponding processes implemented by the network device in each method according to the embodiments of the present application. For the sake of brevity, details will not be described here again.

In an embodiment, the chip can be applied to a terminal device in an embodiment of the present application; moreover, the chip may perform corresponding processes implemented by the terminal device in each method according to the embodiments of the present application. For the sake of brevity, details will not be described here again.

It should be understood that the chip mentioned in the embodiment of the present application may also be termed as a system level chip, a system chip, a chip system or a system-on-chip, or the like.

Figure 10:
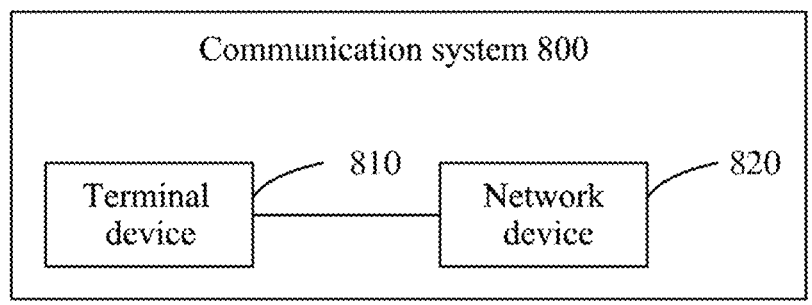
FIG. 10 is a schematic diagram illustrating a communication system according to an embodiment of the present application.

FIG. 10 is a schematic block diagram illustrating a communication system 800 according to an embodiment of the present application. As shown in FIG. 10, the communication system 800 includes a terminal device 810 and a network device 820.

Among them, the terminal device 810 can be used to implement the corresponding function implemented by the terminal device in the above method, and the network device 820 can be used to implement the corresponding function implemented by the network device in the above method. For the sake of brevity, details will not be described here again.

It should be understood that the processor according to the embodiment of the present application may be an integrated circuit chip with signal processing capabilities. During implementation, the steps of the foregoing method embodiments can be completed by a hardware integrated logic circuit or a software instruction in the processor. The above processor may be a general purpose processor, a digital signal processor (Digital Signal Processor, DSP), an application specific integrated circuit (Application Specific Integrated Circuit, ASIC), a field programmable gate array (Field Programmable Gate Array, FPGA) or other programmable logic devices, discrete gate or transistor logic devices, discrete hardware components. The methods, steps, and logical block diagrams disclosed in the embodiments of the present application may be implemented or performed. The general purpose processor may be a microprocessor or the processor may also be any conventional processor or the like. The steps of the methods disclosed in conjunction with the embodiments of the present application may be directly implemented by a hardware decoding processor, or may be performed by a combination of hardware and software modules in a decoding processor. The software module may be located in a storage medium mature in the art, such as a random access memory, a flash memory, a read only memory, a programmable read only memory, an electrically erasable programmable memory, a register, or the like. The storage medium is located in the memory. The processor reads information in the memory and performs the steps of the above methods in combination with its hardware.

It can be understood that the memory in the embodiments of the present application may be a volatile memory or a non-volatile memory, or may include both the volatile memory and the non-volatile memory. The non-volatile memory may be a read-only memory (Read-Only Memory, ROM), a programmable read only memory (Programmable ROM, PROM), an erasable programmable read only memory (Erasable PROM, EPROM), an electrically erasable programmable read only memory (Electrically EPROM, EEPROM) or a flash memory. The volatile memory may be a random access memory (Random Access Memory, RAM), which is used as an external cache. By way of exemplary but not restrictive illustration, many forms of RAMs may be available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM) and a direct Rambus random access memory (Direct Rambus RAM, DR RAM). It should be noted that the memories of the systems and methods described herein are intended to include, but are not limited to these and any other suitable types of memories.

It should be understood that the above mentioned memory is exemplary but not restrictive illustration, for example, the memory in the embodiment of the present application may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (synch link DRAM, SLDRAM) and a direct Rambus random access memory (Direct Rambus RAM, DR RAM), etc. That is to say, the memories in the embodiments of the present application are intended to include, but are not limited to these and any other suitable types of memories.

An embodiment of the present application further provides a computer readable storage medium configured to store a computer program.

In an embodiment, the computer readable storage medium may be applied to a network device in an embodiment of the present application, and the computer program enables a computer to perform corresponding processes implemented by the network device in each method of the embodiments of the present application. For the sake of brevity, details will not be described here again.

In an embodiment, the computer readable storage medium may be applied to a terminal device in an embodiment of the present application, and the computer program enables a computer to perform corresponding processes implemented by the mobile terminal/terminal device in each method of the embodiments of the present application. For the sake of brevity, details will not be described here again.

An embodiment of the present application further provides a computer program product including a computer program instruction.

In an embodiment, the computer program product may be applied to a network device in an embodiment of the present application, and the computer program instruction enables a computer to perform corresponding processes implemented by the network device in each method of the embodiments of the present application. For the sake of brevity, details will not be described here again.

In an embodiment, the computer program product may be applied to a terminal device in an embodiment of the present application, and the computer program instruction enables a computer to perform corresponding processes implemented by the mobile terminal/terminal device in each method of the embodiments of the present application. For the sake of brevity, details will not be described here again.

An embodiment of the present application further provides a computer program.

In an embodiment, the computer program may be applied to a network device in an embodiment of the present application. The computer program which, when running on a computer, enables the computer to perform corresponding processes implemented by the network device in each method of the embodiments of the present application. For the sake of brevity, details will not be described here again.

In an embodiment, the computer program may be applied to a terminal device in an embodiment of the present application. The computer program which, when running on a computer, enables the computer to perform corresponding processes implemented by the terminal device in each method of the embodiments of the present application. For the sake of brevity, details will not be described here again.

It may be known to persons of ordinary skill in the art that, the units and the algorithm steps of each example that are described with reference to the embodiments disclosed herein can be implemented by electronic hardware or a combination of electronic hardware and computer software. The situation whether these functions are performed by hardware or software depends on specific applications and design constraints of the technical solution. Persons skilled in the art may implement the described functions by using different methods for each specific application, and such implementation should not be regarded as going beyond the scope of the present application.

It may be clearly understood by persons skilled in the art that, for the purpose of convenient and brief description, reference may be made to the corresponding process in the foregoing method embodiments for detailed working processes of the foregoing systems, apparatuses, and units, and details will not be described here again.

In several embodiments provided in the present application, it should be understood that the disclosed systems, apparatuses, and methods may be implemented in other manners. For example, the described apparatus embodiments are merely exemplary. For instance, the division of the units is merely a division of logical functions and there may be other divisions during actual implementations. For instance, multiple units or components may be combined or integrated into another system, or some features may be omitted or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on multiple network units. A part or all of the units may be selected according to actual needs to achieve the objectives of the scheme in the embodiments.

In addition, functional units in the embodiments of the present application may be integrated into one processing unit, or each of the units may exist alone physically, or two or more units are integrated into one unit.

If implemented in a form of a software functional unit and sold or used as an independent product, the functions may be stored in a computer readable storage medium. Based on such understanding, the technical solution of the present application essentially, or the part contributing to the prior art, or a part of the technical solution may be implemented in a form of a software product. The computer software product is stored in a storage medium, and includes several instructions for enabling a computer device (which may be a personal computer, a server, or a network device, etc.) to perform all or a part of the steps of the methods described in the embodiments of the present application. The foregoing storage medium includes: any medium that can store program codes, such as a USB flash disk, a mobile hard disk, a read-only memory (Read-Only Memory, ROM), a random access memory (Random Access Memory, RAM), a magnetic disk, or an optical disc, etc.

The above descriptions are merely specific embodiments of the present application; however, the protection scope of the present application is not limited thereto. Any modification or replacement that may be readily envisaged of by persons skilled in the art within the technical scope disclosed in the present application should fall into the protection scope of the present application. Thus, the protection scope of the present application shall be subject to the claims.

What is claimed is:

1. A wireless communication method, comprising:
   determining, by a terminal device, according to information of a spatial geographic location of the terminal device, an identity of a communication sub-zone of the terminal device, wherein the spatial geographic location of the terminal device comprises altitude of the terminal device in a communication zone, and the communication zone comprises at least one communication sub-zone in terms of the spatial geographic location; and
   performing, by the terminal device, sidelink communication on a target resource pool corresponding to the identity of the communication sub-zone of the terminal device;
   wherein the spatial geographic location of the terminal device further comprises longitude and latitude of the terminal device in the communication zone;
   wherein the determining, by the terminal device, according to the information of the spatial geographic location of the terminal device, the identity of the communication sub-zone of the terminal device comprises:
   determining, by the terminal device, according to first configuration information and the information of the spatial geographic location of the terminal device, the identity of the communication sub-zone of the terminal device, wherein the first configuration information comprises spatial dimension information of each communication sub-zone, the spatial dimension information comprises a dimension of each communication sub-zone in a respective direction of the spatial geographic location, the information of the spatial geographic location of the terminal device is distance information of the spatial geographic location of the terminal device relative to a specific location in the communication zone, and the specific location is a location in the communication zone that is a starting point in the respective direction.

2. The method according to claim 1, wherein the identity of the communication sub-zone comprised in the communication zone is of a periodic repetition in the respective direction, and the first configuration information further comprises a repetition period of the identity of the communication sub-zone in the respective direction.

3. The method according to claim 2, wherein the determining, by the terminal device, according to the first configuration information and the information of the spatial geographic location of the terminal device, the identity of the communication sub-zone of the terminal device comprises:
   determining, by the terminal device, the identity (ID) of the communication sub-zone of the terminal device according to the following formula:

$$ID=z1*N_y*N_x+y1*N_x+x1;$$

wherein x1=Floor (x/L) Mod $N_x$, y1=Floor (y/W) Mod $N_y$, z1=Floor (z/H) Mod $N_z$, x is a distance of the spatial geographic location of the terminal device relative to the specific location in terms of longitude, y is a distance of the spatial geographic location of the terminal device relative to the specific location in terms of latitude, z is a distance of the spatial geographic location of the terminal device relative to the specific location in terms of altitude, L is a dimension of each communication sub-zone in terms of longitude, W is a dimension of each communication sub-zone in terms of latitude, H is a dimension of each communication sub-zone in terms of altitude, $N_x$ is a repetition period of the identity of the communication sub-zone in terms of longitude, $N_y$ is a repetition period of the identity of the communication sub-zone in terms of latitude, $N_z$ is a repetition period of the identity of the communication sub-zone in terms of altitude, function Floor indicates rounding down, and function Mod indicates remainder taking;

wherein $N_x$, $N_y$, and $N_z$ each are positive integers greater than 1.

4. The method according to claim 1, wherein the determining, by the terminal device, according to the information of the spatial geographic location of the terminal device, the identity of the communication sub-zone of the terminal device comprises:

determining, by the terminal device, the identity (ID) of the communication sub-zone of the terminal device according to the following formula:

$$ID=z1;$$

wherein $z1=\text{Floor}(z/H)\,\text{Mod}\,N_z$, z is a distance of the spatial geographic location of the terminal device relative to the specific location in the communication zone in terms of altitude, H is a dimension of each communication sub-zone in terms of altitude, $N_z$ is a repetition period of the identity of the communication sub-zone in terms of altitude, the specific location is a location in the communication zone that is a starting point in terms of altitude, function Floor indicates rounding down, and function Mod indicates remainder taking.

5. The method according to claim 1, wherein the identity of the communication sub-zone of the terminal device corresponds to one resource pool which is the target resource pool.

6. The method according to claim 1, wherein the identity of the communication sub-zone of the terminal device corresponds to multiple resource pools, and the method further comprises:

determining, by the terminal device, the target resource pool from the multiple resource pools.

7. A terminal device, comprising:

a memory, a processor, and a computer program stored on the memory and operable on the processor, wherein the processor, when running the computer program, is configured to:

determine, according to information of a spatial geographic location of the terminal device, an identity of a communication sub-zone of the terminal device, wherein the spatial geographic location of the terminal device comprises altitude of the terminal device in a communication zone, and the communication zone comprises at least one communication sub-zone in terms of the spatial geographic location; and perform sidelink communication on a target resource pool corresponding to the identity of the communication sub-zone;

wherein the spatial geographic location of the terminal device further comprises longitude and latitude of the terminal device in the communication zone;

wherein the processor is configured to:

determine, according to first configuration information and the information of the spatial geographic location of the terminal device, the identity of the communication sub-zone of the terminal device, wherein the first configuration information comprises spatial dimension information of each communication sub-zone, the spatial dimension information comprises a dimension of each communication sub-zone in a respective direction of the spatial geographic location, the information of the spatial geographic location of the terminal device is distance information of the spatial geographic location of the terminal device relative to a specific location in the communication zone, and the specific location is a location in the communication zone that is a starting point in the respective direction.

8. The terminal device according to claim 7, wherein the identity of the communication sub-zone comprised in the communication zone is of a periodic repetition in the respective direction, and the first configuration information further comprises a repetition period of the identity of the communication sub-zone in the respective direction.

9. The terminal device according to claim 8, wherein the processor is specifically configured to:

determine the identity (ID) of the communication sub-zone of the terminal device according to the following formula:

$$ID=z1*N_y*N_x+y1*N_x+x1;$$

wherein $x1=\text{Floor}(x/L)\,\text{Mod}\,N_x$, $y1=\text{Floor}(y/W)\,\text{Mod}\,N_y$, $z1=\text{Floor}(z/H)\,\text{Mod}\,N_z$, x is a distance of the spatial geographic location of the terminal device relative to the specific location in terms of longitude, y is a distance of the spatial geographic location of the terminal device relative to the specific location in terms of latitude, z is a distance of the spatial geographic location of the terminal device relative to the specific location in terms of altitude, L is a dimension of each communication sub-zone in terms of longitude, W is a dimension of each communication sub-zone in terms of latitude, H is a dimension of each communication sub-zone in terms of altitude, $N_x$ is a repetition period of the identity of the communication sub-zone in terms of longitude, $N_y$ is a repetition period of the identity of the communication sub-zone in terms of latitude, $N_z$ is a repetition period of the identity of the communication sub-zone in terms of altitude, function Floor indicates rounding down, and function Mod indicates remainder taking;

wherein $N_x$, $N_y$, and $N_z$ each are positive integers greater than 1.

10. The terminal device according to claim 7, wherein the processor is specifically configured to:

determine the identity (ID) of the communication sub-zone of the terminal device according to the following formula:

$$ID=z1;$$

wherein $z1=\text{Floor}(z/H)\,\text{Mod}\,N_z$, z is a distance of the spatial geographic location of the terminal device relative to the specific location in the communication zone in terms of altitude, H is a dimension of each communication sub-zone in terms of altitude, $N_z$ is a repetition period of the identity of the communication sub-zone in terms of altitude, the specific location is a location in the communication zone that is a starting point in terms of altitude, function Floor indicates rounding down, and function Mod indicates remainder taking.

11. The terminal device according to claim 7, wherein the identity of the communication sub-zone of the terminal device corresponds to one resource pool which is the target resource pool.

12. The terminal device according to claim 7, wherein the identity of the communication sub-zone of the terminal device corresponds to multiple resource pools, and the processor is further configured to:
   determine the target resource pool from the multiple resource pools.

13. A network device, comprising:
   a transceiver, a memory, a processor, and a computer program stored on the memory and operable on the processor,
   wherein the processor, when running the computer program, is configured to:
   divide a communication zone of a terminal device into at least one communication sub-zone in terms of a spatial geographic location, wherein the spatial geographic location comprises altitude; and
   control the transceiver to transmit first configuration information to the terminal device, wherein the first configuration information is used by the terminal device to determine a target resource pool corresponding to an identity of the communication sub-zone of the terminal device;
   wherein the spatial geographic location further comprises longitude and latitude, and the processor is further configured to:
   control the transceiver to transmit second configuration information to the terminal device, wherein the second configuration information is used by the terminal device to determine the identity of the communication sub-zone of the terminal device, the second configuration information comprises spatial dimension information of each communication sub-zone, and the spatial dimension information comprises a dimension of each communication sub-zone in a respective direction of the spatial geographic location.

14. The network device according to claim 13, wherein the identity of the communication sub-zone comprised in the communication zone is of a periodic repetition in the respective direction, and the second configuration information further comprises a repetition period of the identity of the communication sub-zone in the respective direction.

* * * * *